Dec. 18, 1962    J. C. HEWITT, JR    3,069,125
HEAT ACTUATED SNAP ACTING VALVE
Filed Jan. 20, 1958

United States Patent Office 3,069,125
Patented Dec. 18, 1962

3,069,125
HEAT ACTUATED SNAP ACTING VALVE
John C. Hewitt, Jr., Long Beach, Calif., assignor to Robertshaw-Fulton Controls Company, Richmond, Va., a corporation of Delaware
Filed Jan. 20, 1958, Ser. No. 709,851
8 Claims. (Cl. 251—11)

This invention relates to valves and more particularly to a heat actuated snap acting valve.

An object of this invention is to utilize a snap acting device as a valve member.

Another object of this invention is to actuate a snap acting valve member in response to temperature variations.

A further object of this invention is to support a heat responsive valve member on a hollow member which houses electric heating means.

It is a further object of this invention to control the flow of fluid through a valve casing by a heat responsive valve member and apply heat to the valve member by means of electric heating means sealed from the flow of fluid.

In carrying out this invention, a casing is provided with an inlet and an outlet passage intersected by a valve seat. A snap acting disc valve member is positioned to have a portion thereof movable relative to the valve seat in response to temperature variations. A tubular member provides support for the valve member and houses an electric heating element which is operative to vary the temperature condition.

Figure 1:
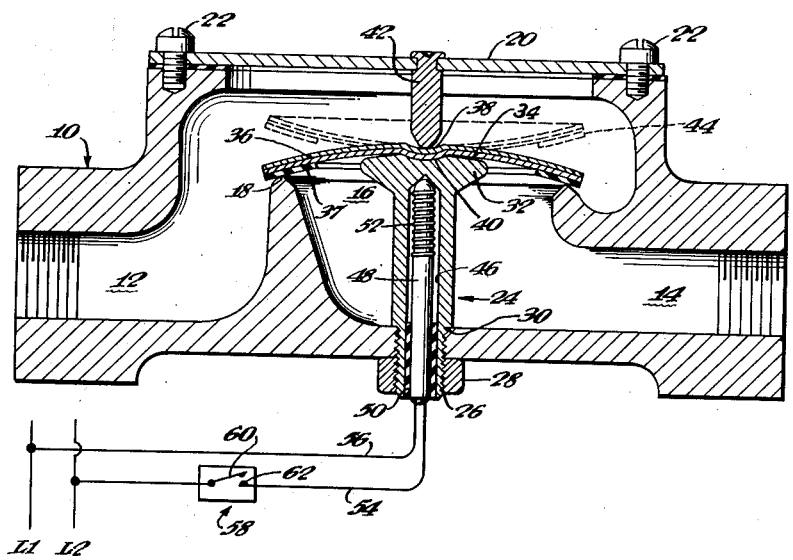
Figure 2:
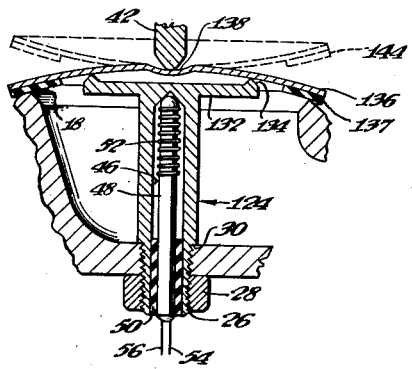

Other objects and advantages will become apparent from the following description taken in connection with the accompanying drawings, wherein:

FIG. 1 is a longitudinal sectional view of a valve embodying this invention; and FIG. 2 is a fragmentary sectional view of a valve showing a modification of this invention.

Referring more particularly to FIG. 1, the valve comprises a casing 10 having an inlet passage 12 in one end and an outlet passage 14 in the other end. The casing 10 is provided with a valve chamber 16 intermediately disposed between the inlet and outlet passages 12 and 14 which are intersected by an annular valve seat 18 formed in the chamber 16 on an internal wall of casing 10. A cover plate 20 seals the upper end of chamber 16 and is secured to casing 10 with a gasket therebetween by any suitable fastening means such as screws 22.

A hollow tubular support member, indicated generally at 24, is positioned in axial alignment with the valve seat 18 and has a lower threaded portion 26 extending through the bottom wall of casing 10. A suitable nut 28 is threaded on portion 26 and tightened to draw a shoulder 30 on a support member 24 into engagement with the internal bottom wall of casing 10 to secure the support member 24. The other end of the tubular support 24 terminates centrally of the valve seat 18 and flanges radially outwardly and upwardly to form a boss 32 which has an upper convex end face 34 spaced upwardly of the plane of the annular valve seat 18.

A generally dish-shaped snap acting disc 36 is utilized as a valve member and supported on the end face 34 in axial alignment with the tubular support 24 and valve seat 18 to control a fluid flow between the inlet passage 12 and the outlet passage 14. An annular member or ring 37 of any suitable sealing material is fixed to the peripheral portion of disc 36 on the underside thereof and is operative to engage the valve seat 18 in the position of the disc 36 shown in FIG. 1. The disc 36 is provided with a generally conical indentation 38 in the central portion thereof, which engages a complemental depression 40 in the end face 34 to maintain axial alignment of the disc 36 with the valve seat 18.

A rod-like element 42 has one end secured to the central portion of cover 20 and another end extending toward the disc 36 in axial alignment with the hollow support 24. The lower end of rod 42 is rounded and abuts the bottom wall of the indentation 38 to hold the disc 36 firmly in engagement with the end face 34. The rod 42 and hollow member 24 thus cooperate to support and fix the central portion of the disc 36 relative to the casing 10.

As indicated on the drawing, the disc 36 is constructed of a suitable bimetal material so as to deform with a snap action in response to temperature variations in a manner which is well known in the art. When the disc 36 is cold, it will have an inherent bias towards the dish-shaped configuration shown in solid lines in FIG. 1 and the ring 37 will engage the valve seat 18 to prevent a fluid flow through chamber 16 from the inlet passage 12 to the outlet passage 14. In response to an increase of heat, the disc 36 will deform to move the ring 37 out of engagement with the valve seat 18. Since the position of the medial portion of disc 36 is fixed by the support member 24 and rod 42, application of heat to the disc 36 will cause the periphery thereof to move relative to its medial portion upwardly to the position illustrated in dashed lines at 44. As the periphery of the disc 36 moves upward in this manner, it will move through a dead center position relative to the medial portion whereupon such peripheral portion will move with snap action to its dashed-line position 44 permitting a fluid flow from inlet passage 12 to outlet passage 14.

The tubular support 24 is provided with an internal bore 46 which houses electric heating means. The electric heating means includes a hollow stem 48 having an upper end engaging a conical recess at the end of bore 46 and a lower end fixed within an insulating sleeve 50 which seals the lower end of bore 46. A heating coil 52 is spirally wound on the upper end of stem 48 and is electrically connected to suitable lead wires 54 and 56 which extend from the interior of stem 48 to the exterior of casing 10. When the heating coil 52 is energized, heat will be transferred therefrom to the tubular support 24 and in turn conducted to the disc 36 to heat the same.

While not limited to, this invention is particularly adapted to the control of a fluid fuel burner such as is employed in a house heating system. To this end, the lead wire 56 is connected to line wire L1 of a suitable power source and a lead wire 54 is connected to another line wire L2 of the source. A thermostat 58 is shown schematically as having a switch arm 60 cooperable with a fixed contact 62 and may be connected in the lead wire 54 to control energization of the heating coil 52. In operation, the switch arm 60 is moved into engagement with the fixed contact 62 in response to a demand for heat. The subsequent energization of coil 52 effects movement of the snap disc 36 to its dashed-line position 44 whereby fuel from a source (not shown) flows from inlet passage 12 through chamber 16 to outlet passage 14 for delivery to a fluid fuel burner (not shown).

If the temperature of the room or space within which the thermostat 58 is positioned corresponds to or exceeds the control temperature of the thermostat 58, the switch arm 60 will be out of engagement with the fixed contact 62 and the heating coil 52 will be de-energized. In this condition of the apparatus, the bimetal disc 36 will be cold and assume the position shown in solid lines wherein the ring 37 engages the seat 18 to prevent the fluid flow. When the temperature of the space around the thermostat 58 drops below the control temperature thereof, the switch arm 60 will move into engagement with the fixed contact 62 to energize the heating coil 52. The heat from heating coil 52 is transferred by conduction through the wall of the tubular support 24 and boss 32 to the snap acting disc 36 causing movement thereof to the dashed-line position 44 to permit the flow of the fluid.

In the modification illustrated in FIG. 2, the same reference numerals of the modification in FIG. 1 have been utilized for identical elements and reference numerals with 100 added have been utilized for similar elements. Consequently, the following description excludes those identical elements which have been described previously.

A hollow tubular support member, indicated generally at 124, is formed of a thermally responsive material so as to be expansible and contractible in response to the heating condition of electric coil 52. The upper end of the tubular support 124 terminates centrally of the valve seat 18 and flanges perpendicularly outwardly to form a plate 132 which is provided with an annular rim 134 extending upwardly from the plane of the annular valve seat 18.

A generally dish-shaped snap acting disc and valve member 136 differs from the disc 36 in FIG. 1 by being constructed of a single metal to form a clicker disc which is well known in the art. The clicker disc 136 is supported on the annular rim 134 of the tubular support 124 in axial alignment therewith. An annular ring 137 of any suitable sealing material is fixed to the peripheral portion of disc 136 on the underside thereof and is operative to engage the valve seat 18 in the position shown in FIG. 2. The clicker disc 136 is provided with a generally conical indentation 138 in the central portion thereof which has abutting engagement with the lower end of rod 42.

During operation of the device shown in FIG. 2, the heating coil 52 is energized causing the thermally responsive tubular support 124 to expand in an upward direction. The upward movement of tubular support 124 and its annular rim 134 presses the clicker disc 136 against the fulcrum rod 42 causing the peripheral portion thereof to move relative to its medial portion upwardly to the position illustrated in dashed lines at 144. As the peripheral portion of the disc 136 moves upward in this manner, it will move through a dead center position relative to its medial portion whereupon such peripheral portion will move with a snap action to its dashed line position 144 where it is separated from the valve seat 18 and a flow of fluid is permitted. When the clicker disc 144 assumes its dashed line position 144, the medial portion thereof will be moved out of engagement with rod 42 and into engagement with the upper surface of circular plate 132.

Inasmuch as various changes may be made in the details and the construction herein disclosed, it is intended that the foregoing descriptions and drawings be interpreted as illustrative and not in a limiting sense.

I claim:

1. In a valve, the combination comprising a casing having a pair of passages separated by a valve seat, a thermally responsive valve member movable relative to the valve seat for controlling a fluid flow between the passages in response to temperature variations, a hollow member positioned in said casing and supporting the medial portion of said valve member, and electric heating means disposed in said hollow member and being operative when energized to heat said medial portion supported by said hollow member to effect actuation of said thermally responsive valve member.

2. In a valve for controlling a fluid flow, the combination comprising a casing having inlet and outlet passages separated by a valve seat, a bimetal valve member having a portion thereof cooperating with the valve seat for controlling the fluid flow in response to temperature variations, a hollow member extending from a wall of said casing and providing support for the medial portion of said valve member, and electric heating means positioned in said hollow member and being operative when energized to heat said medial portion of said bimetal valve member by conduction through said hollow member to effect movement of the valve member portion relative to the valve seat.

3. In a valve, the combination comprising a casing having inlet and outlet passages intersected by a valve seat, a bimetal valve member of generally dish-shaped configuration having a peripheral portion movable with a snap action relative to a medial portion thereof upon application of heat to said valve member, means for supporting said medial portion in said casing to effect snap movement of said peripheral portion into and out of engagement with the valve seat for controlling a fluid flow between said passages, and electric heating means disposed in proximity to said supporting means of said bimetal valve member for heating the supporting means to actuate said bimetal valve member.

4. In a valve, the combination comprising a casing having inlet and outlet passages intersected by a valve seat, a generally dish-shaped valve member having a peripheral portion movable with a snap action relative to a medial portion, an expansible and contractible hollow member extending from a wall of said casing in axial alignment with the valve seat and having an end engaging the medial portion whereby expansion and contraction of said hollow member effects movement of the peripheral portion relative to the valve seat for controlling a fluid flow between said passages, and means extending from an opposite wall of said casing and abutting the medial portion of said valve member for holding the same in engagement with the end of said hollow member.

5. The combination as recited in claim 4 wherein electric heating means is disposed in said hollow member and is operative when energized to effect expansion of said hollow member.

6. In a valve for controlling a fluid flow, the combination comprising a casing having a pair of passages separated by a valve seat, a snap-acting disc cooperating with the valve seat for controlling the fluid flow between the passages, and thermal means positioned in said casing and thermally conductively engaging said disc to cause snap-action thereof in response to temperature variations, said thermal means including a hollow member extending from a wall of said casing in supporting relation with said disc.

7. In a valve for controlling a fluid flow, the combination comprising a casing having a pair of passages separated by a valve seat, a temperature responsive valve member assembly comprising a valve member having a peripheral portion thereof cooperating with the valve seat for controlling the fluid flow and a hollow member extending from a wall of said casing and providing a support for the medial portion of said valve member, and electric heating means positioned within said hollow member and being operative when energized to heat said medial portion of said valve member assembly to effect movement of said peripheral portion of said valve member portion relative to the valve seat.

8. In a valve for controlling a fluid flow, the combination comprising a casing having an inlet and outlet passage intersected by a valve seat, a bimetal valve member of generally dish-shaped configuration positioned in axial alignment with the valve seat and having a peripheral portion movable with a snap action relative to a medial portion upon application of heat to said valve member, a tubular member extending from one wall of said casing in axial alignment with said valve member and having an end engaging the medial portion of said valve member, an electric heating element positioned within said tubular member and operative when energized to heat said valve member by conduction through said tubular member to effect movement of said valve member relative to the valve seat, and an abutting member extending from an opposite wall of said casing for holding said valve member into engagement with said tubular member.

References Cited in the file of this patent

UNITED STATES PATENTS

| | | |
|---|---|---|
| 2,301,318 | Peo | Nov. 10, 1942 |
| 2,484,405 | Eskin | Oct. 11, 1949 |
| 2,515,229 | Jenkins | July 18, 1950 |
| 2,698,022 | Fahnoe | Dec. 28, 1954 |
| 2,833,507 | Dube | May 6, 1958 |

FOREIGN PATENTS

| | | |
|---|---|---|
| 437,391 | Great Britain | 1935 |